US012807041B2

(12) United States Patent
Kuczynski et al.

(10) Patent No.: US 12,807,041 B2
(45) Date of Patent: Nov. 24, 2026

(54) RECONFIGURABLE BEAD-BASED SEAT PLUS PAD

(71) Applicant: GM Global Technology Operations LLC, Detroit, MI (US)

(72) Inventors: Edward Thaddeus Kuczynski, Ann Arbor, MI (US); Daniel W. Booth, Bloomfield Hills, MI (US); Matthew B. Erdey, Troy, MI (US); Jill M. Green, Highland, MI (US); Bonita J. Thomas, Linden, MI (US); Paul W. Alexander, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 22 days.

(21) Appl. No.: 18/760,997

(22) Filed: Jul. 1, 2024

(65) Prior Publication Data

US 2026/0000204 A1 Jan. 1, 2026

(51) Int. Cl.

| | |
|---|---|
| ***B60N 2/02*** | (2006.01) |
| ***A47C 7/14*** | (2006.01) |
| ***B60N 2/70*** | (2006.01) |

(52) U.S. Cl.

CPC ................ *B60N 2/026* (2023.08); *A47C 7/14* (2013.01); *B60N 2/70* (2013.01)

(58) Field of Classification Search

CPC .. A47C 7/14; A47C 7/26; B60N 2/026; B60N 2/70

USPC ..................................................... 297/452.17

See application file for complete search history.

(56) References Cited

U.S. PATENT DOCUMENTS

| | | | | | |
|---|---|---|---|---|---|
| 4,171,549 | A * | 10/1979 | Morrell | A47C 27/086 5/655.4 |
| 4,179,158 | A * | 12/1979 | Flaum | A47C 13/00 297/440.17 |
| 4,525,130 | A * | 6/1985 | Netznik | A61G 5/00 425/DIG. 60 |
| 6,457,773 | B1 * | 10/2002 | Gates | A47C 7/029 297/452.21 |
| 9,433,301 | B2 * | 9/2016 | Brechet | A47C 4/54 |
| 11,432,660 | B1 * | 9/2022 | Lacy | A47C 15/006 |

FOREIGN PATENT DOCUMENTS

| | | | |
|---|---|---|---|
| DE | 19910427 | A1 | 9/2000 |
| DE | 102017205146 | A1 | 9/2018 |
| DE | 102018208625 | A1 | 12/2019 |

* cited by examiner

*Primary Examiner* — Milton Nelson, Jr.

(74) *Attorney, Agent, or Firm* — Honigman LLP; Matthew H. Szalach

(57) ABSTRACT

A seat assembly includes a seat bottom having a cushion and a covering. The covering includes a flexible exterior surface configured to receive a user sitting at the seat assembly. The cushion includes a bead-based pad. The bead-based pad includes a flexible first pouch defining a first compartment. A first set of beads are movable within the first compartment. Responsive to the user sitting at the seat assembly, the first pouch flexes according to flexing of the exterior surface and the first set of beads move within the first compartment to at least partially conform the first pouch and the exterior surface of the covering to a shape of the user.

12 Claims, 4 Drawing Sheets

RECONFIGURABLE BEAD-BASED SEAT PLUS PAD

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a passenger seat for a vehicle and, more specifically, to cushioning of a seat bottom of a passenger seat.

The cushioning included in automotive seat bottoms generally includes a fixed and non-moveable padding, such as a thermoset foam. The padding is traditionally configured to compress when a passenger sits on the seat and does not generally conform to different body shapes and body sizes of the passengers using the seat. Thus, the orientation and contour of the seat cushioning remains generally consistent regardless of who is using the seat. Further, traditional padding used in seat cushions, such as thermoset foam, deflects as it is compressed by the passenger sitting in the seat, which results in discomfort caused by counterforces being applied from the seat cushion onto the passenger.

SUMMARY

One aspect of the disclosure provides a seat assembly. The seat assembly includes a seat bottom having a cushion and a covering. The covering includes a flexible exterior surface configured to receive a user sitting at the seat assembly. The cushion includes a bead-based pad. The bead-based pad includes a flexible first pouch defining a first compartment. A first set of beads are movable within the first compartment. Responsive to the user sitting at the seat assembly, the first pouch flexes according to flexing of the exterior surface and the first set of beads move within the first compartment to at least partially conform the first pouch and the exterior surface of the covering to a shape of the user.

Implementations of the disclosure may include one or more of the following optional features. In some implementations, the cushion further includes a foam pad. The bead-based pad is disposed between the foam pad and the covering.

In some examples, the pouch includes at least an upper layer and a lower layer defining the compartment between the upper layer and the lower layer. The upper layer includes the covering.

In some aspects, the pouch includes an airtight material. Responsive to a vacuum source applied to the first compartment, the first pouch resists flexing to fix the first set of beads within the first compartment to maintain a shape of the bead-based pad.

In some implementations, the bead-based pad further includes a flexible second pouch defining a second compartment separate from the first compartment. A second set of beads are movable within the second compartment. In further implementations, responsive to the user sitting at the seat assembly, the second pouch resists flexing to a different degree than the first pouch.

In some examples, the beads of the first set of beads include at least one selected from the group consisting of (i) a sphere shape, (ii) an oval shape, (iii) a bean shape, (iv) a coffee bean shape, and (v) an irregular shape. In some aspects, the beads of the first set of beads have a coefficient of friction that is less than 0.15. In some implementations, the beads of the first set of beads have a diameter that is between 0.6 millimeters and 3 millimeters. In some examples, a fluidic material is disposed within the compartment and at least partially between respective beads of the first set of beads.

Another aspect of the disclosure provides a seat assembly. The seat assembly includes a seat bottom having a cushion and a covering. The covering includes a flexible exterior surface configured to receive a user sitting at the seat assembly. The cushion includes a foam pad and a bead-based pad disposed between the foam pad and the covering. The bead-based pad includes a plurality of flexible pouches defining respective compartments. Each respective compartment of the plurality of pouches accommodates a respective set of beads movable within the respective compartment. Responsive to the user sitting at the seat assembly, the plurality of pouches flex according to flexing of the exterior surface and the respective sets of beads move within the respective compartments to at least partially conform the plurality of pouches and the exterior surface of the covering to a shape of the user. This aspect may include one or more of the following optional features.

In some implementations, each pouch of the plurality of pouches respectively includes at least an upper layer and a lower layer defining the respective compartment of the pouch. The respective upper layers of the plurality of pouches includes the covering.

In some examples, the plurality of pouches include an airtight material. Responsive to a vacuum source applied to the respective compartments of the plurality of pouches, the plurality of pouches resist flexing to fix the respective sets of beads within the respective compartments to maintain a shape of the bead-based pad.

In some aspects, responsive to the user sitting at the seat assembly, a second pouch of the plurality of pouches resists flexing to a different degree than a first pouch of the plurality of pouches. In some implementations, a fluidic material is disposed within each respective compartment of the plurality of pouches and at least partially between the beads of the respective sets of beads.

Another aspect of the disclosure provides a vehicle. The vehicle includes a seat assembly including a seat bottom having a cushion and a covering. The covering includes a flexible exterior surface configured to receive a user sitting at the seat assembly. The cushion includes a bead-based pad. The bead-based pad includes a flexible pouch defining a compartment. A set of beads are movable within the compartment. Responsive to the user sitting at the seat assembly, the pouch flexes according to flexing of the exterior surface and the set of beads move within the compartment to at least partially conform the pouch and the exterior surface of the covering to a shape of the user. This aspect may include one or more of the following optional features.

In some implementations, the cushion further includes a foam pad. The bead-based pad is disposed between the foam pad and the covering.

In some examples, the pouch includes at least an upper layer and a lower layer defining the compartment between the upper layer and the lower layer. The upper layer includes the covering.

In some aspects, the beads of the set of beads include at least one selected from the group consisting of (i) a sphere shape, (ii) an oval shape, (iii) a bean shape, (iv) a coffee bean shape, and (v) an irregular shape. In some implementations, the beads of the set of beads have a coefficient of friction that is less than 0.15.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
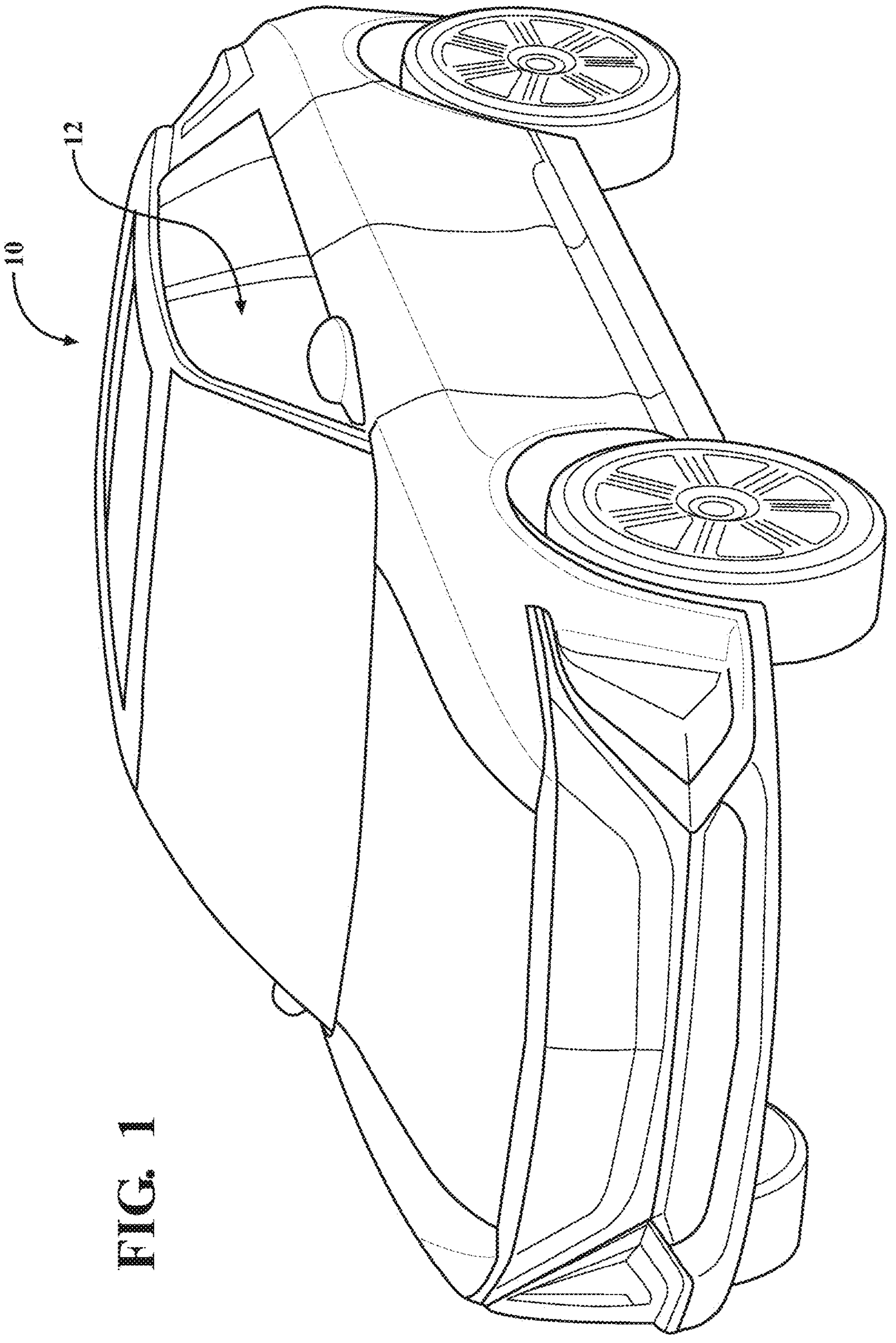
FIG. 1 is a perspective view of a vehicle that includes a seat assembly in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
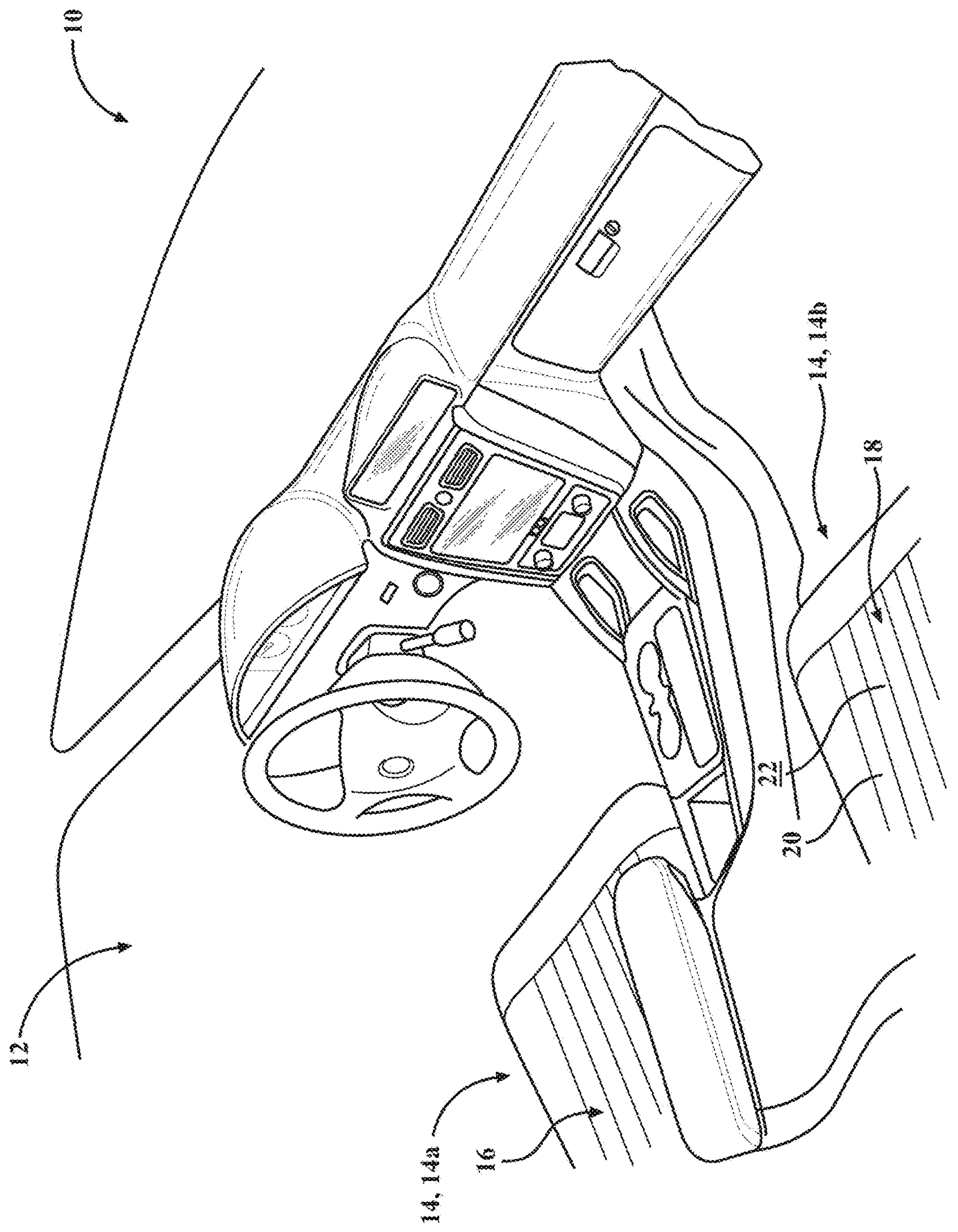
FIG. 2 is a perspective view of an interior cabin of the vehicle of FIG. 1 accommodating the seat assembly of FIG. 1.

With reference to FIGS. 1 and 2, a vehicle 10 includes an interior cabin 12 accommodating one or more seat assemblies 14 at corresponding seating positions within the interior cabin 12 of the vehicle 10, such as a driver's seat 14, **14*a* at a driver seating position and a passenger's seat 14, 14*b* at a passenger seating position. Each seat assembly 14 includes a seat bottom 16 that is configured to receive a user or passenger sitting at the seat assembly 14, such as a user driving the vehicle 10 or a passenger of the vehicle 10. The seat bottom 16 includes a cushion 18 configured to soften or pad the seat bottom 16 for the user and a covering 20 that extends over the cushion 18 and provides an exterior surface 22 that receives the user sitting at the seat assembly 14**.

The covering 20 is formed from a flexible or adaptable material that allows the cushion 18 to deflect or compress when the user is sitting at the seat assembly 14 and that may allow the cushion 18 to recover or expand when the user leaves the seat assembly 14. For example, the covering 20 may include any material suitable for the seat bottom 16, such as leather, vinyl, fabric, cloth, a combination of multiple materials, and the like. The specific type of material used for the covering 20 may depend on the specific vehicle or interior in which the seat assembly 14 is installed and does not diverge from the claimed subject matter of this disclosure. Thus, the exterior surface 22 of the seat covering 20 is flexible to accommodate the user sitting at the seat assembly 14 and to transfer forces between the user sitting at the seat bottom 16 and the cushion 18.

Figure 3:
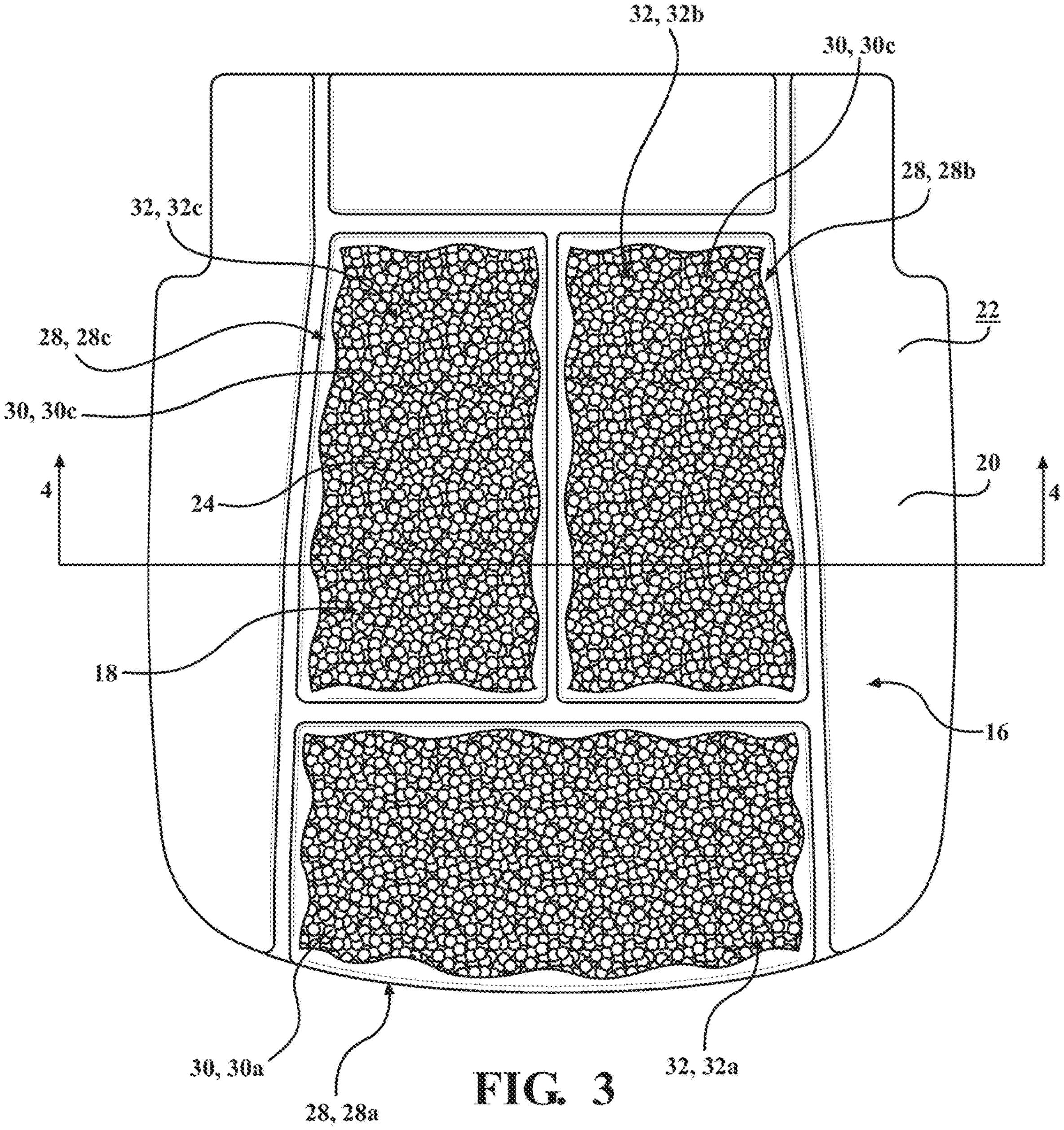
FIG. 3 is a top-side view of a seat bottom of the seat assembly of FIG. 1 with a covering of the seat bottom removed to show beads disposed within respective pouches of a bead-based pad of the seat bottom.
Figure 4:
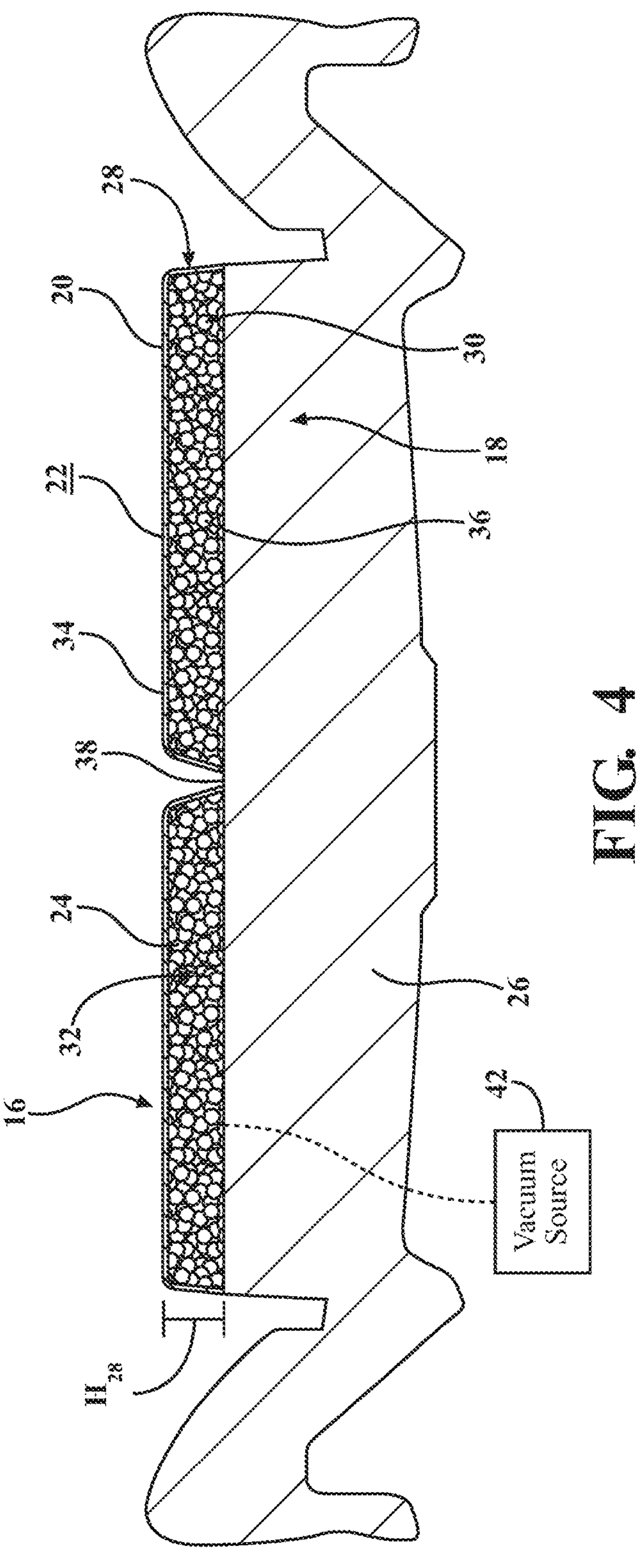
FIG. 4 is a sectional view of the seat bottom of the seat assembly of FIG. 1 taken along line 4-4 of FIG. 3.

With reference to FIGS. 3 and 4, the cushion 18 of the seat bottom 16 has an outer-most cushioning layer that includes a bead-based pad 24. A foam pad 26 may be disposed beneath the bead-based pad 24 to provide an additional cushioning layer between the bead-based pad 24 and a structural frame (not shown) of the seat assembly 14. Further, the foam pad 26 may provide the outer-most cushioning layer at other portions of the seat assembly 14, such as along a backrest portion of the seat assembly 14 or along seat bolsters of the seat bottom 16. The bead-based pad 24 may be disposed between the foam pad 26 and the covering 20 along the seat bottom 16, with the covering 20 extending directly along the foam pad 26 at other portions of the seat assembly 14 (e.g., the backrest portion).

In the illustrated example, the bead-based pad 24 includes one or more flexible pouches 28 defining respective compartments 30. A plurality of beads or a set of beads 32 are disposed within each compartment 30 with the shape of the flexible pouch 28 (and, thus, the cushion 18) adjusting based on movement of the beads 32 within the compartment 30. As shown in FIG. 3 and as discussed further below, the respective pouches 28 are arranged along the seat bottom 16 and adjacent to one another. For example, a first pouch 28, 28*a* defining a first compartment 30, 30*a* and accommodating a first set of beads 32, 32*a* may be disposed along a forward or under-thigh portion of the seat bottom 16. A second pouch 28, 28*b* defining a second compartment 30, 30*b* and accommodating a second set of beads 32, 32*b*, and a third pouch 28, 28*c* defining a third compartment 30, 30*c* and accommodating a third set of beads 32, 32*c* may each be disposed along adjacent rearward portions of the seat bottom 16. The quantity and arrangement of the pouches 28 of the bead-based pad 24 may depend on the styling, design, and configuration of the seat assembly 14, which may vary based on the vehicle in which the seat assembly 14 is installed. Each compartment 30 is sealed and partitioned from the compartments 30 of other pouches 28 to retain the set of beads 32 of the pouch 28 in the respective compartment 30, and so that each pouch 28 is individually conformable based on movement of its respective beads 32 within its compartment 30. Thus, responsive to the user sitting at the seat assembly 14, the one or more pouches 28 flex according to flexing of the exterior surface 22 and the set of beads 32 of the pouches 28 move within the respective compartments 30 to at least partially conform the pouches 28 and the exterior surface 22 of the covering 20 to the shape or contour of the user sitting at the seat assembly 14.

The set of beads 32 may be micro-beads that are low-friction and loose from one another. In other words, the set of beads 32 are able to independently move within the compartment 30 without being restricted by significant friction between individual beads. For example, a coefficient of friction between the individual beads 32 may be less than or equal to about 0.15. The movement of the set of beads 32 within the compartment 30 may be constrained by the size, shape, and/or density of the beads 32 (i.e., how tightly the set of beads 32 are packed within the compartment 30), and/or the configuration of both the bead-based pad 24 and the individual pouches 28 (e.g., the shape of the compartment 30 and the arrangement of adjacent pouches 28). That is, fluidity of the beads 32 within each compartment 30 may be based on dimensions of the compartment 30, dimensions of the individual beads 32, density of the beads 32 within the compartment 30, and the like, where a degree of fluidity of the beads 32 contributes to the ability of the pouch 28 to resist flexing and, thus, provide plush or firm cushioning for the user. For example, the pouch 28 may have a thickness or height H28 between the exterior surface 22 and the foam pad 26 that is between about 10 millimeters and about 25 millimeters. Furthermore, when the set of beads 32 are packed tightly within the compartment 30 (and, thus, there is a relatively high density of beads 32 within the compartment 30, such as 50 percent or more by volume, 75 percent or more by volume, 90 percent or more by volume, and the like) the pouch 28 resists movement to a greater degree than if the set of beads 32 are packed in a looser or less dense manner. In other words, the tightly-packed pouch 28 may provide a firmer feel to the user sitting at the seat assembly 14 compared to a loosely packed pouch 28. The density of the set of beads 32 within the compartment 30 may vary by vehicle, by compartment 30 within one seat assembly 14, and the like. For example, the first compartment 30*a* may have beads 32*a* that are packed tighter or at a higher density than the beads 32*b* included in the second compartment 30*b*, causing the first pouch 28*a* to resist flexing to a different degree than the second pouch 28*b* and, thus, provide a different level of cushioning and conformability to the user at the portion of the seat bottom 16 corresponding to the first pouch 28*a*.

The set of beads 32 may be formed from any suitable material, such as an expanded polystyrene, expanded polypropylene, expanded thermoplastic polyurethane, glass, silica, or similar material. Further, the beads 32 may respectively have a diameter between about 0.6 millimeters and about 3 millimeters. In different examples, the set of beads 32 may be spherically-shaped, oval-shaped, bean-shaped, coffee bean-shaped, irregularly shaped, or include a combination of beans having various shapes. Differently shaped beads 32 may interact differently with one another, such that round or oval-shaped beads 32 may move more easily relative to one another than beads 32 that are bean-shaped or have edges or polygonal shapes, which may cause different portions of the cushion 18 to have different levels of firmness based on bean shape.

Moreover, the weight of the set of beads 32 may be adjusted based on the desired firmness of the pouch 28 or cushion 18. For example, a pouch 28 having a heavier set of beads 32 may resist movement and flexing to a greater degree than a pouch 28 having a lighter set of beads 32. Thus, each pouch 28 and set of beads 32 may be configured to adjust bead weight, bead shape, and density of beads within the compartment, among other factors, to adjust the ability of the pouch 28 to resist flexing and, thus, adjust the firmness of the cushion 18.

A powder, lubricant, or other fluid material may be disposed within the compartment 30 among and between the respective beads 32 to adjust fluidity of the beads within the pouch 28. That is, a powder or lubricant may be applied to the beads 32 to alter the coefficient of friction between beads 32 included in the pouch 28 to accommodate how freely the set of beads 32 can move when the user sits on the seat bottom 16. The powder, lubricant, or fluid material may increase firmness of the cushion 18 (i.e., increase the pressure needed to cause the beads 32 to move relative to one another) or reduce firmness of the cushion (i.e., decrease the pressure needed to cause the beads 32 to move relative to one another).

Thus, when the user sits on the exterior surface 22 of the covering 20 of the seat bottom 16, the exterior surface 22 flexes to accommodate the user while the cushion 18 at least partially flexes and/or compresses to provide comfort and support. That is, the foam pad 26 may compress when the user sits on the seat bottom 16, and the bead-based pad 24 may flex as the set of beads 32 move and reconfigure to conform to the shape of the user. This may provide an enhanced level of support and comfort compared to a cushion that only includes a foam pad. Unlike foam pads, the beads of the bead-based pad 24 move out of place under deflection and do not apply significant counterforces to the user. In this regard, when the user sits on the seat bottom 16, the exterior surface 22 and the pouch 28 flexes, allowing the set of beads 32 to displace, move, and form to the size and shape of the user with minimal exertion of force against the user, reducing the restrictive forces of the foam pad 26 within the cushion 18 and providing the user with comfort and support. Additionally, during extended periods of use, such as the user sitting on the seat bottom 16 during a long drive in the vehicle 10, the plurality of beads 32 can move and reconfigure themselves as the user adjusts or shifts his sitting positioning. The beads 32 also provide tailored support and contouring regardless of the user, as the set of beads 32 will move and reconfigure as different users sit on the seat bottom 16. For example, if a first user sits on the seat bottom 16, the set of beads 32 will move and contour to the size and shape of the first user. If the first user exits the seat assembly 14, and a second user enters the seat assembly 14, the beads reconfigure and move based on the size and shape of the second user, even if the size and shape of the second user is significantly different than the size and shape of the first user.

The compartments 30 of the pouches 28 may be configured in any suitably flexible manner. In the illustrated example, the compartment 30 is defined by a first or upper layer or wall 34 and a second or lower layer or wall 36 opposite the upper layer 34. The upper layer 34 may be provided by an inner surface of the covering 20 opposite the exterior surface 22 at which the user sits. In this example, the covering 20 is not porous enough to allow for the respective beads 32 to escape through the covering 20. Furthermore, the lower layer 36 may be the foam pad 26, or, the lower layer 36 may be any suitable material that separates the bead-based pad 24 from the foam pad 26, such as a sheet of fabric or a sheet of leather stitched between the bead-based pad 24 and the foam pad 26. Just like the upper layer 34, the lower layer 36 includes a material that is not porous enough to allow for the beads 32 to escape the compartment 30. Further, the upper layer 34 and the lower layer 36 may be stitched or adhered to one another between compartments 30, creating respective partitions 38 that prevent the set of beads 32 from exiting one compartment 30 and entering another compartment 30. Optionally, the partitions may be formed from separate walls or layers of material that extend between the upper layer 34 and the lower layer 36.

In some examples, the pouch 28 may include a sack, a bag, or a balloon that is installed between the covering 20 and the foam pad 26 to provide the bead-based pad 24. In other words, the pouch 28 includes a membrane forming a pouch bag that defines the compartment 30. In this example, the bead-based pad 24 may function similarly to the bead-based pad 24 described above in which the compartment 30 is defined by the upper layer 34 and the lower layer 36. However, the individual pouch bags disposed between the covering 20 and the foam pad 26 allow each pouch 28 to be removed and/or replaced without repairing or replacing the whole bead-based pad 24. Further, the pouch bags may allow for easier installation where the beads 32 are not exposed (and, thus, liable to spill) prior to installation of the covering 20 to seal the compartments 30. Additionally, use of the pouch bag allows the covering 20 to have any level of permeability, as the covering 20 does not directly interact with the set of beads 32.

In some examples, one or more of the pouches 28 may be connected to a vacuum source 42 positioned at or near the seat assembly 14. The vacuum source 42 is electrically operable to apply a vacuum to the pouch 28, thus removing air from the pouch 28 and urging the upper layer 34 toward the lower layer 36 to capture or restrict movement of the beads 32 within the compartment 30. This may increase the firmness of the cushion 18 (i.e., cause the pouch 28 to further resist movement of the beads 32 and exterior surface 22) and/or prevent the bead-based pad 24 from further changing shape or conforming to the user. The pouch 28 may be formed from an airtight material to accommodate operation of the vacuum source 42.

That is, applying a vacuum to the pouch 28 via the vacuum source 42 allows the configuration of the set of beads 32 to be controlled by the vacuum. As an example, if the user sits on the seat bottom 16, thus flexing the exterior surface 22 and the pouch 28, and causing the set of beads 32 to move and conform to the size and shape of the user, the vacuum source 42 may be operated to apply a vacuum to the pouch 28. The applied vacuum fixes and locks the set of beads 32 in place to exactly conform to the user, even if the user exits the seat assembly 14 and returns at a later time with the vacuum still applied.

Optionally, the vacuum source 42 may be used to return the bead-based pad 24 to its original or default shape after the user exits the seat assembly 14. As an example, when the user exits the seat assembly 14 after an extended period of use, the exterior surface 22 of the covering 20 may retain an imprint that matches that shape of the user due to the set of beads 32 having been moved to accommodate the size and shape of the user. While the set of beads 32 may return to a flatter and more uniform configuration over a period of time, to expedite the process, the vacuum source 42 may provide vacuum to the pouch 28 as soon as the user exits the seat assembly 14. In doing so, the vacuum source 42 moves the set of beads 32, via vacuum, back to a flat and uniform configuration, removing the imprint left by the previous user and quickly providing an aesthetic of a smooth and uniform exterior surface 22 of the covering 20.

Operation of the vacuum source 42 to apply and/or release the vacuum at the pouch 28 may be activated by a user input within the interior cabin 12 of the vehicle 10, such as an input to save or retain the current seat position. Optionally, the vacuum source 42 may be activated based on determination that the user has entered or exited the seat assembly 14, or based on determination that a different user has entered the seat assembly 14 from the previous user.

When a user sits on the seat bottom 16 of the seat assembly 14, the set of beads 32 included in the bead-based pad 24 will conform to the size and shape of the user, providing support and comfort while applying minimal counter-pressure to the user. The foam pad 26 positioned underneath the bead-based pad 24 creates additional support and structure to the seat bottom 16. The bead-based pad 24 may include multiple pouches 28 and corresponding compartments 30 to provide tailored sections of support to the user, with the set of beads 32 in each compartment 30 being isolated from one another. When a different user sits on the seat bottom 16, the set of beads 32 reposition and conform to the size and shape of the different user. A vacuum may be applied to the airtight pouch 28 to restrict movement of the set of beads 32. Although the seat assembly as described herein has a bead-based pad included or integrated with its bottom or seat portion, it should be understood that the bead-based pad may be included or integrated with other portions of the seat assembly, such as the seat back, a headrest, an armrest, side bolsters, and the like.

In some examples, the pouch 28 may be formed from an air permeable material, such as a woven fabric. This allows at least some airflow through and within the pouch 28, such as to prevent the pouch 28 from retaining heat from the user sitting at the seat assembly. Further, the air permeable pouch 28 may allow the seat assembly to include a cooling system (e.g., for cooled seats) where one or more fans direct cooling airflow through the exterior surface 22 of the seat assembly to keep the user cool. The cooling airflow may be directed through the air permeable pouch 28 and the exterior surface 22.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A seat assembly comprising:

a seat bottom having a cushion and a seat bottom covering extending over the cushion, the seat bottom covering comprising a flexible exterior surface configured to receive a user sitting at the seat assembly, the cushion comprising a bead-based pad, the bead-based pad comprising:

a flexible first pouch defining a first compartment; and a first set of beads movable within the first compartment;

a flexible second pouch defining a second compartment separate from the first compartment; and a second set of beads movable within the second compartment, wherein the seat bottom covering extends over both the first pouch and the second pouch, wherein the first pouch comprises at least an upper layer and a lower layer defining the first compartment between the upper layer and the lower layer, the upper layer of the first pouch comprising a portion of the seat bottom covering, wherein, responsive to the user sitting at the seat assembly, the first pouch and the second pouch flex according to flexing of the exterior surface, the first set of beads and the second set of beads move within the first compartment and the second compartment, respectively, to at least partially conform the first pouch, the second pouch, and the exterior surface of the seat bottom covering to a shape of the user, and wherein, responsive to a downward force applied by the user sitting at the seat assembly, the first pouch flexes by a different amount than the second pouch, and wherein the first pouch and the second pouch each comprise an airtight material and, responsive to a vacuum source applied to the first compartment and the second compartment, the first pouch and the second pouch resist flexing to fix the first set of beads and the second set of beads within the first compartment and the second compartment, respectively, to maintain a shape of the bead-based pad.

2. The seat assembly of claim 1, wherein the cushion further comprises a foam pad, the bead-based pad disposed between the foam pad and the seat bottom covering.

3. The seat assembly of claim 1, wherein the beads of the first set of beads comprise at least one of (i) a sphere shape, (ii) an oval shape, (iii) a bean shape, (iv) a coffee bean shape, or (v) an irregular shape.

4. The seat assembly of claim 1, wherein the beads of the first set of beads have a coefficient of friction that is less than 0.15.

5. The seat assembly of claim 1, wherein the beads of the first set of beads have a diameter that is between 0.6 millimeters and 3 millimeters.

6. The seat assembly of claim 1, wherein a fluidic material is disposed within the first compartment and at least partially between respective beads of the first set of beads.

7. A seat assembly comprising:

a seat bottom having a cushion and a seat bottom covering extending over the cushion, the seat bottom covering comprising a flexible exterior surface configured to receive a user sitting at the seat assembly, the cushion comprising a foam pad and a bead-based pad disposed between the foam pad and the seat bottom covering, the bead-based pad comprising a plurality of flexible pouches defining respective compartments, each respective compartment of the plurality of flexible pouches accommodating a respective set of beads movable within the respective compartment, wherein the seat bottom covering extends over the plurality of flexible pouches, wherein each pouch of the plurality of flexible pouches respectively comprises at least an upper layer and a lower layer defining the respective compartment of the pouch, the respective upper layers of the plurality of flexible pouches comprising respective portions of the seat bottom covering, wherein, responsive to the user sitting at the seat assembly, the plurality of pouches flex according to flexing of the exterior surface and the respective set of beads move within the respective compartments to at least partially conform the plurality of flexible pouches and the exterior surface of the seat bottom covering to a shape of the user, and wherein, responsive to a downward force applied by the user sitting at the seat assembly, a first pouch of the plurality of pouches flexes by a different amount than a second pouch of the plurality of flexible pouches, and wherein the plurality of flexible pouches comprise an airtight material and, responsive to a vacuum source applied to the respective compartments of the plurality of flexible pouches, the plurality of flexible pouches resist flexing to fix the respective set of beads within the respective compartments to maintain a shape of the bead-based pad.

8. The seat assembly of claim 7, wherein a fluidic material is disposed within each respective compartment of the plurality of flexible pouches and at least partially between the beads of the respective set of beads.

9. A vehicle comprising:

a seat assembly comprising:

a seat bottom having a cushion and a seat bottom covering extending over the cushion, the seat bottom covering comprising a flexible exterior surface configured to receive a user sitting at the seat assembly, the cushion comprising a bead-based pad, the bead-based pad comprising:

a flexible first pouch defining a first compartment;

a first set of beads movable within the first compartment;

a flexible second pouch defining a second compartment separate from the first compartment; and a second set of beads movable within the second compartment, wherein the seat bottom covering extends over both the first pouch and the second pouch, wherein the first pouch comprises at least an upper layer and a lower layer defining the first compartment between the upper layer and the lower layer, the upper layer of the first pouch comprising a portion of the seat bottom covering, wherein, responsive to the user sitting at the seat assembly, the first pouch and the second pouch flex according to flexing of the exterior surface and the first set of beads and the second set of beads move within the first compartment and the second compartment, respectively, to at least partially conform the first pouch, the second pouch, and the exterior surface of the seat bottom covering to a shape of the user, and wherein, responsive to a downward force applied by the user sitting at the seat assembly, the first pouch flexes by a different amount than the second pouch, and wherein the first pouch and the second pouch each comprise an airtight material and, responsive to a vacuum source applied to the first compartment and the second compartment, the first pouch and the second pouch resist flexing to fix the first set of beads and the second set of beads within the first compartment and the second compartment, respectively, to maintain a shape of the bead-based pad.

10. The vehicle of claim 9, wherein the cushion further comprises a foam pad, the bead-based pad disposed between the foam pad and the seat bottom covering.

11. The vehicle of claim 9, wherein the beads of the first set of beads comprise at least one of (i) a sphere shape, (ii) an oval shape, (iii) a bean shape, (iv) a coffee bean shape, or (v) an irregular shape.

12. The vehicle of claim 9, wherein the beads of the first set of beads have a coefficient of friction that is less than 0.15.

* * * * *